UNITED STATES PATENT OFFICE.

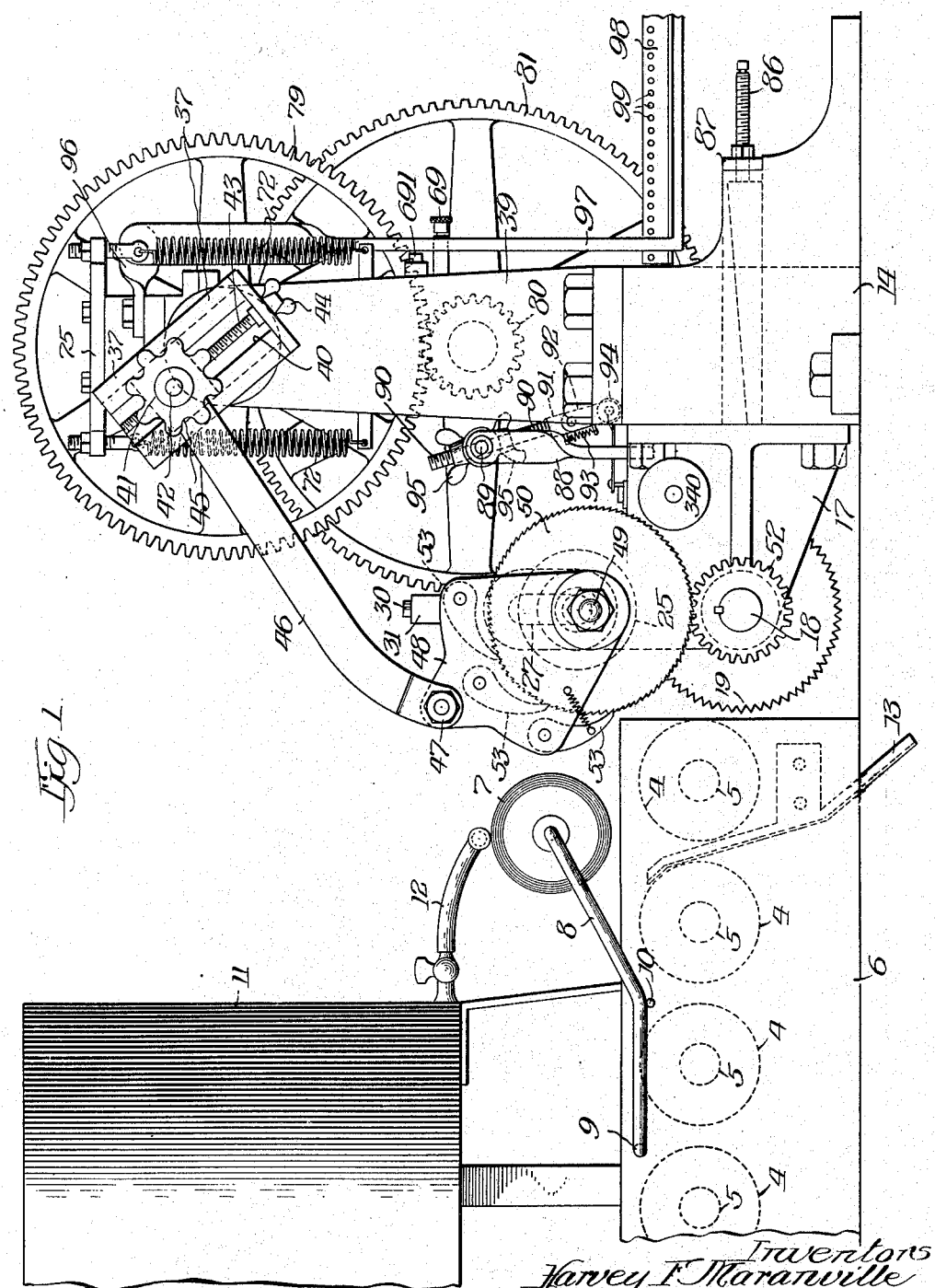

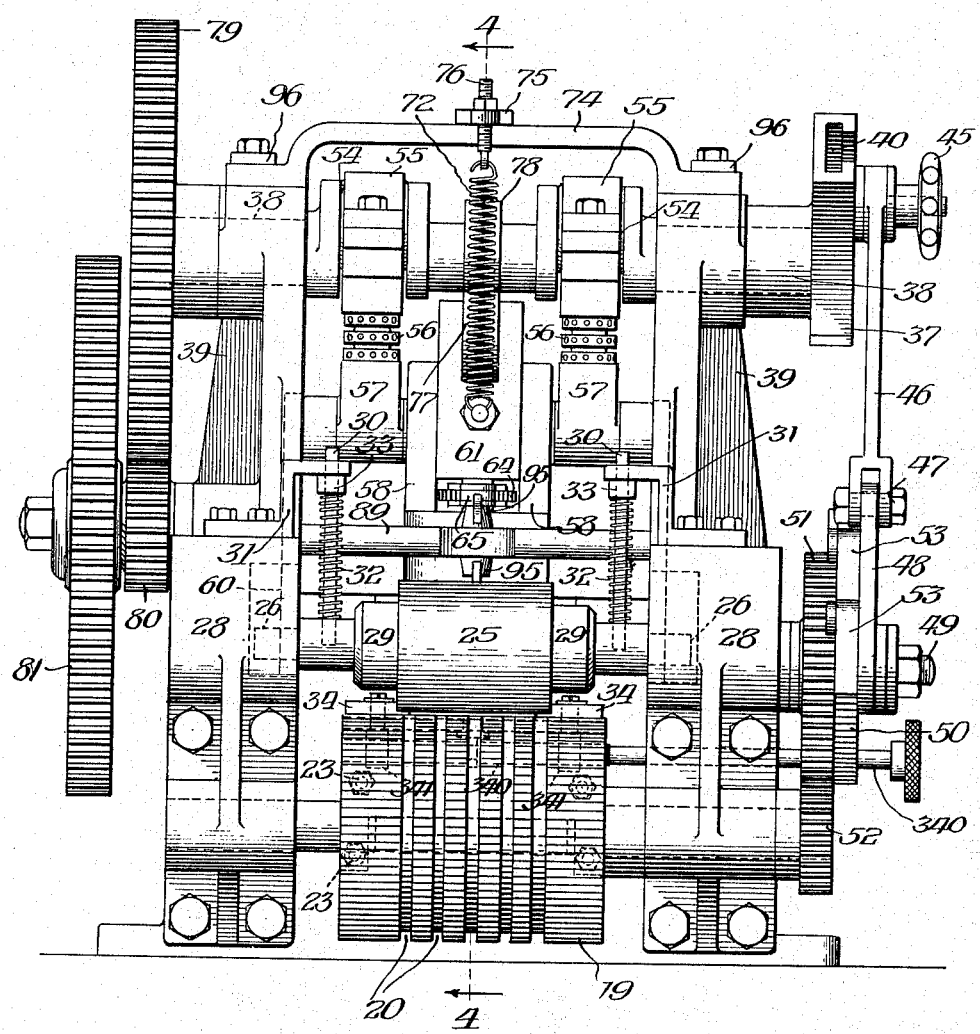

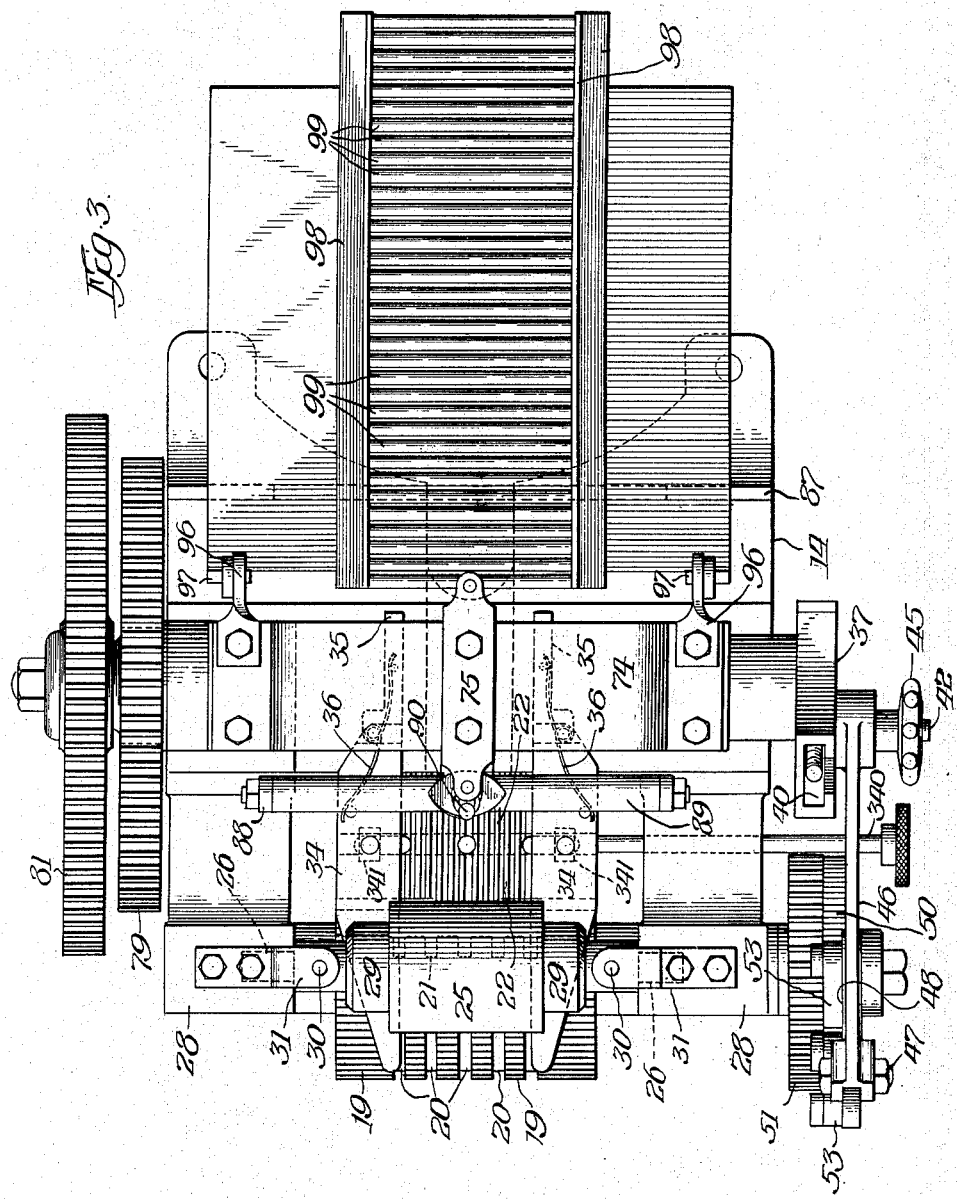

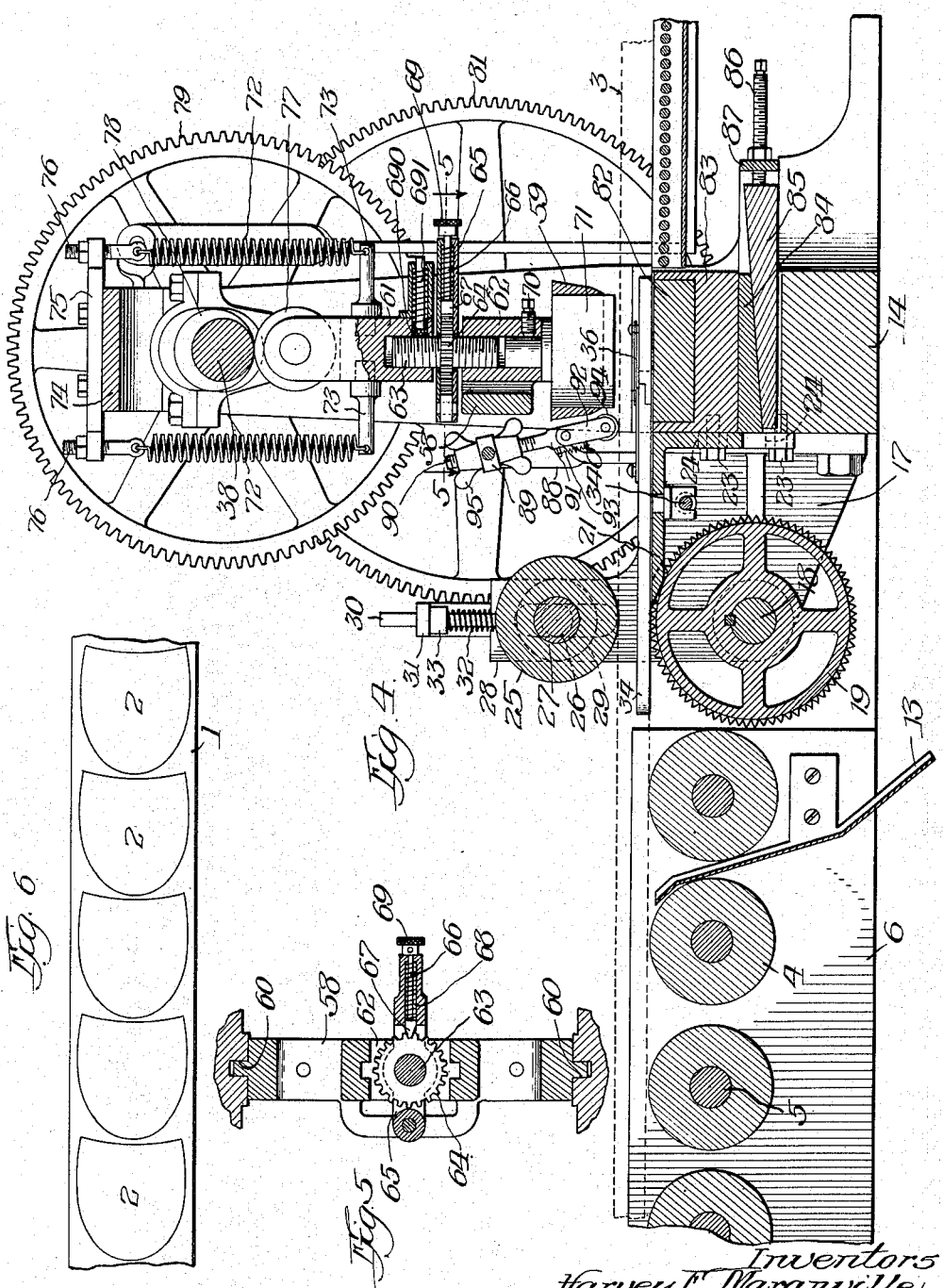

HARVEY F. MARANVILLE AND HORACE D. STEVENS, OF AKRON, OHIO, ASSIGNORS TO THE FIRESTONE TIRE AND RUBBER COMPANY, OF AKRON, OHIO, A CORPORATION OF OHIO.

RUBBER-PUNCHING MACHINE.

1,394,422.  Specification of Letters Patent.  Patented Oct. 18, 1921.

Application filed October 7, 1919. Serial No. 328,988.

*To all whom it may concern:*

Be it known that we, HARVEY F. MARANVILLE and HORACE D. STEVENS, citizens of the United States, residents of Akron, county of Summit, State of Ohio, have invented certain new and useful Improvements in Rubber-Punching Machines, of which the following is a specification.

This invention relates to a machine for the purpose of cutting or punching out blanks of fixed sizes, and is particularly intended for use in cutting out blanks of uncured or unvulcanized rubber. While it is shown as especially designed for the purpose of cutting out pieces of unvulcanized rubber for rubber heel manufacture, it may be used for other purposes as will be apparent.

In the manufacture of rubber heels it is important that a sufficient quantity of rubber be placed in each cavity of the mold so that proper curing may be obtained and a slight amount of overflow should be allowed. Too much overflow is not desirable as it is wasteful and increases the difficulty of the trimming operation. For these reasons there has been here designed a machine which will accurately cut out the proper amount of rubber, being readily adjustable to cut a greater or less thickness of blank. Rubber in plastic, uncured condition is very hard to cut accurately and many difficulties which have heretofore interfered with the preparation of this stock have been overcome by the machine of this application.

While the showing is specific, it will be understood that the invention is not limited to the details, but may be varied without affecting the scope of the patent.

In the drawings:

Figure 1 is a side elevation of the machine.

Fig. 2 is a front elevation.

Fig. 3 is a plan.

Fig. 4 is a longitudinal section on the line 4—4 of Fig. 2.

Fig. 5 is a section on the line 5—5 of Fig. 4 showing the mechanism for adjusting the depth of the plunger stroke.

Fig. 6 is a view showing the manner in which the blanks are cut from the stock.

The soft, plastic rubber from which the heels are formed is extruded from a die in the form of a long strip of approximately the thickness of the heel blank. This strip of rubber is shown in Fig. 6 at 1, the heel blanks being designated by the numeral 2.

In Fig. 4 the upper surface of the rubber strips is shown by the dotted line 3.

The end of the rubber strip is placed on a plurality of rollers 4 journaled on shafts 5 supported on a framework 6, the front end passing under a felt or fabric covered roller 7. This roller is supported on a pair of light arms 8 pivoted at 9 on the framework 6, the pins 10 limiting the downward movement of the roller. The roller receives water from a tank 11 through a flexible pipe 12, discharging over the top of this roller. By means of the tank fed roller, the upper surface of the rubber strip is covered with a film of water, which enables the die parts of the machine to cut out the blanks as required. A metallic trough 13 is located under the roller 7 and serves to conduct away the overflow.

In front of the framework 6 is secured a base plate or standard 14 to the rear side of which is fastened a pair of brackets 17 in which is rotatably mounted a shaft 18. Centrally located on the shaft 18 is a feed roll 19, the outer surface of which is serrated or corrugated to grip the under side of the rubber strip, being provided with a plurality of grooves 20, into which are received a plurality of stripping fingers 21 projecting rearwardly from a table 22 adjustably mounted on the rear of the standard 14 by bolts 23 passing through the slots 24. Above the feed roll is mounted a pressure roll 25 loosely mounted on the shaft 26, the ends of which are received in vertical slots 27 in extension 28 on the brackets 17. Around the shaft 26 at the sides of the rollers are arranged a pair of collars 29. In the ends of the shafts are screwed a pair of pins 30, the upper ends of which pass through the ends of brackets 31 secured on the upper ends of the extension 28. Around each pin is arranged a light coil spring 32, the upper end of which is confined by a washer 33.

The upper surface of the table 22 is provided with a plurality of ribs which serve to reduce the amount of surface contact with the rubber so that it may be passed over the table freely, there being provided at the sides of the table adjustable guide plates 34, the adjustment being obtained by a reversibly threaded shaft 340 engaging eyes 341 depending from the guides. The main portions of the guide plates are stationary, but the forward ends are provided with pivoted wings or extensions 35, which extend to the points opposite which the die acts upon the rubber and are arranged to yield when the plunger descends or the die enters the rubber strip and causes it to spread outwardly. The yielding movement is permitted by light springs 36 arranged as shown in Fig. 3. The feeding of the rubber is performed by a rotating crank arm 37 carried upon the end of a main shaft 38 which is rotatably mounted in bearings at the upper end of uprights 39 secured to the standards 14. In order to provide for an adjustable feed of the rubber strips the crank arm is formed with a slot 40 in which is carried a slide 41 supporting the crank pin 42. Adjustment of the slide is obtained by a screw shaft 43 carrying a nut 44, and the locking of the slide in any position is done by a hand nut 45.

The pitman is indicated by the numeral 46 and is pivotally connected at 47 to a rocking fan-shaped sector 48, which is pivoted on a stub-shaft 49 projecting from the bracket 17. Also mounted on the shaft 49 is a ratchet 50 to the rear face of which is secured a gear 51 in mesh with a gear 52 keyed to the shaft 18. On the rear face of the sector are carried a plurality of pawls 53 which are so arranged as to fall at different points on the several ratchet teeth. This provides for a minute feed and prevents back lash, which in a combination with the adjustable throw of the crank-pin assures an accurate feed for any size die.

The main drive-shaft 38 carries at either side of its center between the uprights 39 two crank portions 54 on which are carried sleeves 55, to the lower sides of which are connected reversely screw threaded adjusting bolts 56. These bolts carry bearings 57 which are pivotally connected to cutting block carrier 58, to the lower side of which is secured a die or knife 59 of the shape of the blank to be cut. The cutting block carrier is slidably received in guideways 60 in the sides of the uprights and is arranged to cut a single blank at each stroke, although the number may be increased if desired.

As shown in Fig. 5, the carrier 58 is arranged with a central opening in which is received and guided a two part plunger rod, the upper part being designated by the numeral 61 and the lower by the numeral 62, the two parts being connected by a reversely screw threaded bolt 63. Between the two portions of the plunger rod the bolt is formed with a small toothed wheel 64. About the wheel 64 is arranged a casing 65 in which is slidably mounted a pin 66, the inner end 67 of which is pointed to enter between the teeth of the wheel, being forced inwardly by a light coil spring 68. The head of the pin is formed with a grip 69 by which the wheel is rotated to adjust the two halves of the plunger, locking means for the plunger being provided in any suitable way, here shown as a plug 690 forced against the screw threads by a spring plunger 691.

In the lower half of the plunger rod is secured, by a set screw 70, a compressor head 71 which fits within the die. The plunger rod is held at the upper limit of its movement by a pair of coil springs 72 secured at their lower ends to laterally projecting pins 73 fastened in the upper half of the plunger rod. Across the two standards 39 is secured a bridge piece 74 to the center of which is fastened a cross arm 75, in the extremities whereof are supported pins 76. The springs 72 are connected to the pins 76. The upper end of the plunger rod carries a roller 77 which bears against a cam 78 formed midway of the shaft 38.

The arrangement of the cam and crank portion of the main shaft 38 is such that the plunger is forced downwardly on the top of the strip of rubber just before the die descends and is held in that position while the die makes its cutting stroke. This action on the part of the plunger or compressor serves to compress the rubber into the exact thickness required for the blank. By adjustment of the two halves of the plunger rod the amount of rubber in each blank may be definitely determined.

The main shaft 38 is rotated by means of a gear 79 on the end of the shaft, in mesh with a pinion 80 carried on a suitable shaft which also carries a gear 81 driven from any suitable source of power.

Beneath the die is arranged a cutter block 82 seated in a holder 83 which rests on a pair of wedges 84 and 85 so that vertical adjustment may be obtained. The wedges are adjusted by means of a set screw 86, threaded into a plate 87 secured on the base 14.

Secured to rear of the support 14 is a pair of brackets 88 into the upper ends of which is secured a cross shaft 89 in the central portion of which is threaded an adjusting screw 90, the lower end being provided with a head 91 on which is pivotally mounted a clevis or yoke 92. The yoke is held in alinement with the body of the screw by a light spring 93. On the lower side of the clevis is carried a stripper roller 94. The arrangement of the parts is such that the roller 94 rests on the surface of the rubber strip just back of the die, the purpose being to prevent the rubber from rising with the die upon its return stroke. The movement allowed by the jointed arrangement of the lower end of the stripper arm is sufficient to allow the roller 94 to withdraw if required by the inclination of the outer surface of the die (Fig. 4). A pair of wing nuts 95 serve to hold the adjusting screw 90 in proper position and permit adjustment of the screw for varying thickness of stock or sizes of dies.

From the upper ends of the standards 39 are extended a pair of lugs 96 from which are suspended hangers 97 which sustain a pair of rails 98. Between the rails 98 are suspended a plurality of rollers 99 on which the rubber strip is received after passing under the die.

In the operation of the machine, the operator places a length of uncured rubber of the required cross section on the rollers 4 and between the feed roller 19 and the pressure roller 25. As the strip passes under the roller 7, the upper surface receives a film of water which aids in the cutting of the rubber. The strip is advanced step by step by the feed roller 19 operated through the crank connection 46 and is guided by the members 34. As the die descends between the feeding strokes, the plunger or compressor 71 first presses the rubber to the proper thickness and holds it while the knife 59 descends and cuts out the blank. As the die descends the movable portion 35 of the guides give and permit the rubber to move outwardly as the knife enters it. The film of water on top of the rubber permits the knife to enter the rubber and prevents the latter from sticking to the plunger. The stripper roller 94 holds the rubber strip on the bed. The rubber strip with the heels cut out passes out onto the rollers 99 and the blanks may be removed by the operator.

During the operation of the machine the depth to which the plunger descends, and the consequent thickness of the stock, may be regulated by the adjustment of the two halves of the plunger, and the amount of feed may be varied by adjustment of the slide 41.

Changes and modifications may be made in the machine without departing from the spirit of this invention, and it will be understood that many alterations in detail fall within the scope of this invention.

We claim:

1. In a machine of the character described, the combination of a die for cutting rubber stock, a compression plunger within the die, and means causing the plunger to descend upon the rubber and compress it to a predetermined thickness prior to and during the operation of the die.

2. In a machine of the character described, the combination of a die for cutting rubber, a compression plunger within said die, an unyielding means for causing the plunger to descend upon the rubber and compress it to a definite thickness prior to and during the operation of the die, and means for spreading a film of water upon the upper surface of the rubber.

3. In a machine of the character described, the combination of a die for cutting rubber, a plunger within said die, positively actuated means for moving the plunger into contact with the rubber prior to the actuation of the die to compress the rubber to a definite predetermined thickness, means for wetting the rubber upon which the knife acts, and yieldable guides located adjacent the die.

4. In a machine of the character described, the combination of a die for cutting rubber stock, a plunger within the die, means for causing the plunger to descend to a definite predetermined point upon the rubber and compress it prior to and during the operation of the die, and adjustable mechanism for regulating the depth of descent of the plunger.

5. In a machine of the character described, the combination of a die for cutting rubber stock, a plunger for compressing the stock to a predetermined thickness, feeding mechanism for advancing the stock through the machine, a guide for the stock extending at the sides of the die, and means for yieldingly holding said guide in place but permitting lateral movement thereof as the rubber is compressed.

6. In a machine of the character described, the combination of a die for cutting rubber stock, a plunger for bringing the stock to a predetermined thickness, feeding mechanism for advancing the stock through the machine, means for wetting the upper surface of the rubber, guides for the stock extending at the sides of the die, and means for yieldingly holding said guides in place but permitting lateral movement thereof as the rubber is compressed.

7. In a machine of the character described, the combination of a die for cutting rubber stock, a compression plunger within said die, a two part rod for carrying said plunger, adjustable mechanism for connecting the two parts of said rod, and means for forcing said plunger on to said rubber during the movement of the die.

8. In a machine of the character described, the combination of a die for cutting rubber stock, a compression plunger within said die, a two part rod for carrying said plunger, adjustable mechanism for connecting the two parts of said rod, means for forcing said plunger onto said rubber during the movement of the die, and means for covering the rubber stock with a film of water.

9. In a machine of the character described, the combination of a die for cutting rubber stock, a plunger within the die, an adjustable rod for supporting the plunger, means for actuating the die and for forcing the plunger upon the rubber during the movement of the die, a pair of yieldable guides at the sides of the stock, and a stripping mechanism for removing the rubber from the die.

HARVEY F. MARANVILLE.
HORACE D. STEVENS.